United States Patent
Rothrock et al.

[15] 3,655,090
[45] Apr. 11, 1972

[54] VESSEL AND CLOSURE WITH INTERLOCKING SHEAR RING JOINT

[72] Inventors: Elmer Weyman Rothrock, Hinsdale, Ill.; Silvio D. Niku, Memphis, Tenn.

[73] Assignee: Chicago Bridge & Iron Company, Oak Brook, Ill.

[22] Filed: June 25, 1970

[21] Appl. No.: 49,837

[52] U.S. Cl. ........................ 220/42 A, 220/40 S, 220/46 P, 220/55 PC
[51] Int. Cl. ........................................................ B65d 41/06
[58] Field of Search ................. 220/40 R, 42 A, 46 P, 55 PC, 220/40 S, 55 A, 46 MS

[56] References Cited

UNITED STATES PATENTS

| | | | |
|---|---|---|---|
| 2,885,108 | 5/1959 | Donoghue | 220/46 X |
| 1,809,079 | 6/1931 | Smith | 220/55 PC UX |
| 2,660,330 | 11/1953 | Keller | 220/46 X |
| 3,125,240 | 3/1964 | Gerard et al. | 220/46 X |
| 3,398,853 | 8/1968 | Jorgensen | 220/46 X |

*Primary Examiner*—M. Henson Wood, Jr.
*Assistant Examiner*—Michael Y. Mar
*Attorney*—Merriam, Marshall, Shapiro & Klose

[57] ABSTRACT

A vessel with an opening walled thereabout and having a rim projecting forward from a shelf portion on the inside of, and substantially lateral to, the wall, a groove in the shelf portion between the inner surface of the wall and the rim defining a shear ring between the groove and the inner surface wall, and a closure having a peripheral edge which fits inside the vessel rim and a projecting tongue on the inner side of the closure which mates with and fits in the groove in the vessel shelf.

3 Claims, 7 Drawing Figures

PATENTED APR 11 1972 3,655,090

INVENTORS
Elmer W. Rothrock
Silvio D. Niku

BY Merriam, Marshall, Shapiro & Klose

ATTORNEYS

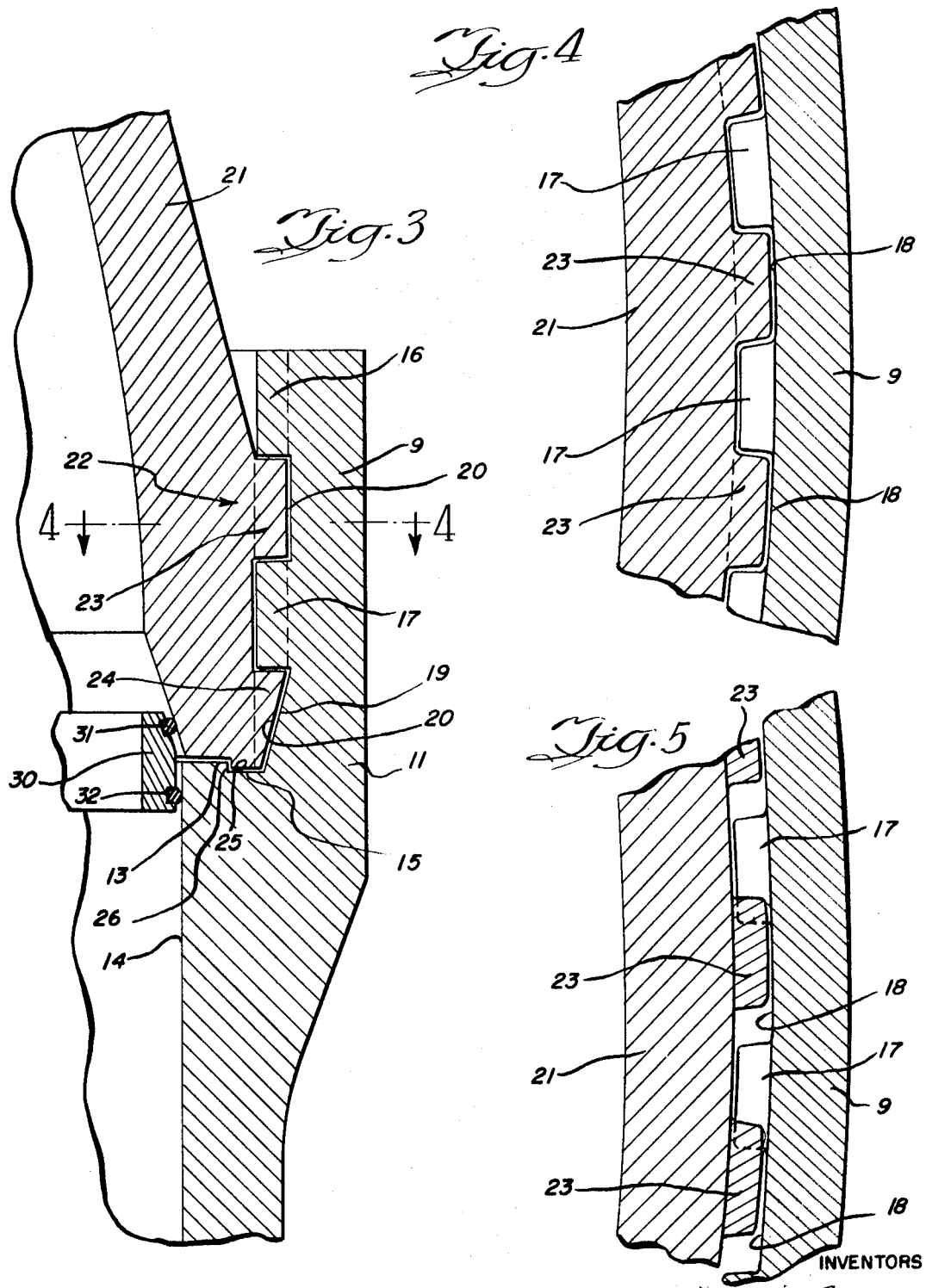

INVENTORS
Elmer W. Rothrock
Silvio D. Niku
BY Merriam, Marshall, Shapiro & Klose
ATTORNEYS

VESSEL AND CLOSURE WITH INTERLOCKING SHEAR RING JOINT

This invention relates to vessels, and particularly to vessels used for high pressure operations and processing. More particularly, this invention is concerned with structural improvements in pressure vessels having openings and closures for such openings.

Vessels of many sizes and shapes are used in industrial operations, as well as in research. Such vessels are usually made of metal, and particularly steel, although they can be made of other substances such as glass fiber reinforced plastic materials. The use of such vessels often requires that access be had to the vessel interior for maintenance operations and performance of other functions. This necessitates that one or more access openings be provided. Since many of the vessels are operated at high pressures the provision of adequate closures with sufficiently good joints and seals presents a problem, particularly since many of the openings must be quite large, as for example 20 feet or more in diameter.

Various shaped closures have been used on such vessel openings. A heavy flat plate can be used or a dished or domed closure can be employed. Conventionally, the closure structure is securely joined to the vessel proper by studs threaded in holes in a flange about the periphery of the vessel opening. The studs protrude through holes provided in the closure. Nuts are then threaded on the ends of the studs and tension applied to securely join the closure to the vessel. While such a closure has performed satisfactorily on many vessels in the past, it is an expensive type of closure because of the cost of threading holes in the vessel, drilling holes in the closure and the cost of the studs. The system also requires considerable time to secure the closure in place and to remove it at some later time. As a result, various quick opening types of closures have been developed.

One type of quick opening closure utilizes a conventional breech-type structure. In such a closure, the closure plate or cover is first moved longitudinally inside of the open end of the vessel and then is rotated a short distance to position various laterally protruding tabs or flange portions on the closure beneath cooperating lateral tabs or flanges located on the inside surface of the wall opening. The tabs on the edge of the closure are spaced apart from adjacent tabs as are the tabs on the inside surface of the vessel opening. This permits the closure to move longitudinally with each tab on the closure positioned between adjacent tabs on the inside of the vessel opening. The surfaces of the tabs on the closure are generally parallel to one another and also parallel to the surfaces of the tabs located inside the vessel opening. However, adjoining tabs of the closure and of the vessel can be pitched in the same direction in the nature of a thread so that rotation of the closure facilitates additional tightening of the closure on the vessel.

Another quick opening closure employs shear studs. The closure is positioned inside the edge of the vessel opening with abutting edge surfaces of the closure and vessel in close proximity. A series of metal studs is then positioned around the edge of the closure such that a longitudinal portion of each stud is located in the closure edge and another longitudinal portion of each stud is located in the adjoining edge of the vessel opening. While such studs can be made of one piece, for quick opening of the studs the studs are conveniently made in two longitudinal halves. By positioning the split shear studs with the stud longitudinal section lines lateral to the abutting edge of the closure and the vessel opening, the closure is held securely in place. However, by rotating the split shear stud so that the section line of the two halves is located in line with the edge of the closure and the inner edge of the vessel opening, the closure can be readily removed by moving it longitudinally. Half of each split shear stud remains in the edge of the closure and the other half remains in the edge of the vessel opening. The closure can be repositioned readily by placing it in the opening and then rotating the two halves of each of the split shear studs 90°. The operation of such a system is more fully described and disclosed in copending U.S. patent application Ser. No. 831,112, filed June 6, 1969 now U.S. Pat. No. 3,549,186 and its disclosure is fully incorporated herein by reference.

Although the use of quick opening closures such as those described have clear advantages over the conventional bolted type closure, elastic growth of the shell and development of a rotating moment at the edge of the closure due to high internal pressure can lead to separation of the edge of the cover from the vessel and reduce the structural integrity of the joint. High pressures inside the vessel cause the diameter to increase and simultaneously the pressure exerted against the closure, whether it be a flat plate or a domed cover, causes the lower peripheral edge thereof to rotate inwardly or, in other words, for the closure to deform or deflect towards a domed or more domed closure structure. Separation of the adjoining faces of the closure edge and inside surface of the vessel opening can lead to leakage at the joint as well as failure of the structure. There is thus a need for an improved structure which permits utilization of quick opening closures for high pressure vessel openings that will minimize or eliminate development of a significant gap between the closure edge and the internal surface of a vessel opening.

According to the present invention, there is provided a vessel having an opening and a closure for the opening which in combination forms a joint which minimizes or eliminates development of a gap or separation between the edge of the closure and the internal adjacent surface of the vessel opening while the vessel is subjected to high internal pressure. The vessel opening has an interior wall with an integral rim thinner than the wall projecting upward from a shelf portion on the inside of and substantially lateral to the wall. The shelf portion has a groove between the inner surface of the wall and the rim, thus defining a shear ring between the groove and the inner surface of the vessel wall. The closure has a peripheral edge which fits inside the vessel rim in close proximity thereto. A projecting tongue or flange is located on the inner side face of the closure, adjacent the closure periphery, and is of such size and dimensions as to mate with and fit into the groove in the vessel shelf. The resulting joint structure in section thus appears to be of the tongue and groove type.

The invention will be described further in conjunction with the attached drawings in which:

FIG. 3 is a vertical sectional view through the vessel of FIGS. 1 and 2 and shows the vessel walls about an opening as well as the lower edge of a closure for the opening;

FIG. 4 is a sectional view along the line 4—4 of FIG. 3 and shows the position of the closure with a breech type joint when it is first slid into the opening of the vessel;

FIG. 5 is a sectional view similar to FIG. 4 but shows the breech type joint after the closure has been rotated slightly;

Figure 1:
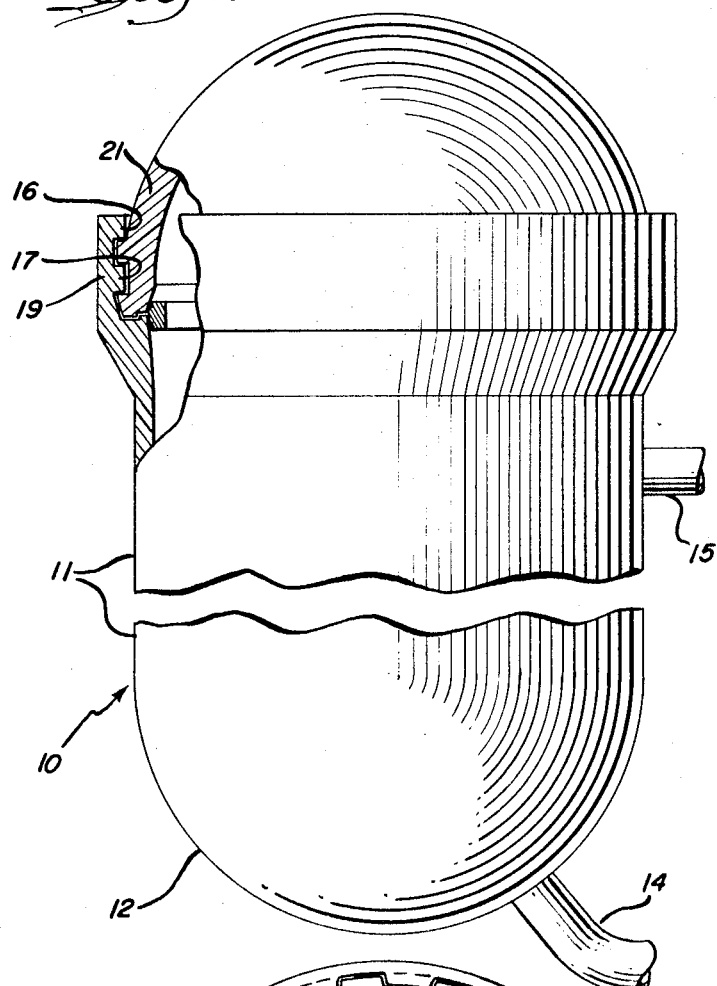
FIG. 1 is an elevational view, partially broken away and in section, showing a vessel, and closure for the vessel, embodying the invention.
Figure 2:
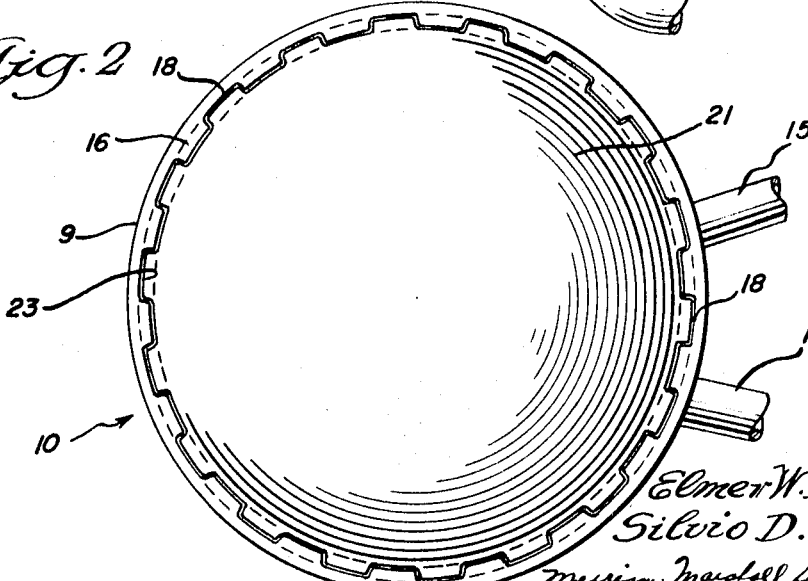
FIG. 2 is a plan view of the vessel and closure of FIG. 1.

With reference to FIGS. 1 and 2 of the drawings, vessel 10 has a generally cylindrical wall 11 and a hemispherical bottom 12 joined to, or integrally formed with, wall 11. The upper end of vessel 10 has a circular opening with a diameter of substantially the size of cylindrical wall 11. This opening is closed or sealed by removable closure 21 shown as a hemispherical structure. Conduits 14 and 15 can be used to supply material to the vessel or remove it therefrom. Other conduits can obviously be employed although for some processing none may be needed.

With reference to FIG. 1 to 3, wall 11 has an integral rim 9 extending upwardly from a shelf portion 13 on the inside of, and substantially lateral to, internal surface 14 of wall 11. A groove 15 is located in shelf portion 13 (See FIG. 3).

A series of grooves 18, advisably equally dimensioned in width and depth and equally spaced from one another, are located axially to the vessel and extend for the length of rim 9. The grooves thus define between adjacent grooves, the side faces of projecting tabs 16 and 17. Channel 19 is located in the bottom area of rim 9 and extends to groove 15. Channel 19 has a tapered inner wall which mates with the adjoining tapered surface 20 on the end of closure 21. Groove or channel 20 also extends around the inner face of rim 9 and defines the upper surface of tabs 17 and the lower surface of tabs 16.

Closure 21 comprises a hemispherical wall with peripheral edge 22 which fits in close proximity to the internal surfaces of rim 9. A series of protruding tabs 23 fit into groove 20 in rim 9 and tabs 24 fit into groove 19. Furthermore, tabs 23 and 24 are dimensioned to slide longitudinally in axially located grooves 18. FIG. 4 illustrates how the tabs on the vessel internal rim surface mesh with the tabs on the peripheral edge 22 of closure 21 to permit slidable axial movement to place the closure in position and to remove it. Once the closure is positioned as shown in FIG. 4, relative rotation of closure 21 with respect to vessel 10 effects at least partial and advisably total placement of tabs 23 and 24 on the closure edge beneath the respective tabs 16 and 17 on the vessel internal rim surface. The resulting joint thus described is of the breech lock type and provides for quick opening of the vessel and ready removal of the closure.

To minimize or prevent relative displacement of wall 11 with respect to peripheral edge 22 of closure 21 when the vessel is subjected to high internal pressure, a tongue or ring 25 is provided on the end of the closure along its peripheral edge. The tongue 25 is dimensioned in width and height to mate with groove 15 located in the shelf portion 13 of rim 9. The interlocking action of tongue 25 in groove 15 restricts formation of a gap between the edge of the closure and the vessel wall because tongue 25 is placed in shearing abutment with the walled edge 26 of groove 15. The shearing interlocking structure as shown in FIG. 3 supplies a radial bearing force which counters the effect of eccentric loading of bearing surfaces in the breech lock quick opening and closing structure. The applied moment acting on the edge of the closure or cover is resisted by the shearing interlocking tongue and groove structure as illustrated by FIG. 3.

Self-sealing ring 30, provided with O-ring gaskets 31 and 32, is employed to render the joint between the vessel and the closure gas tight and is of a conventional type.

Figure 6:
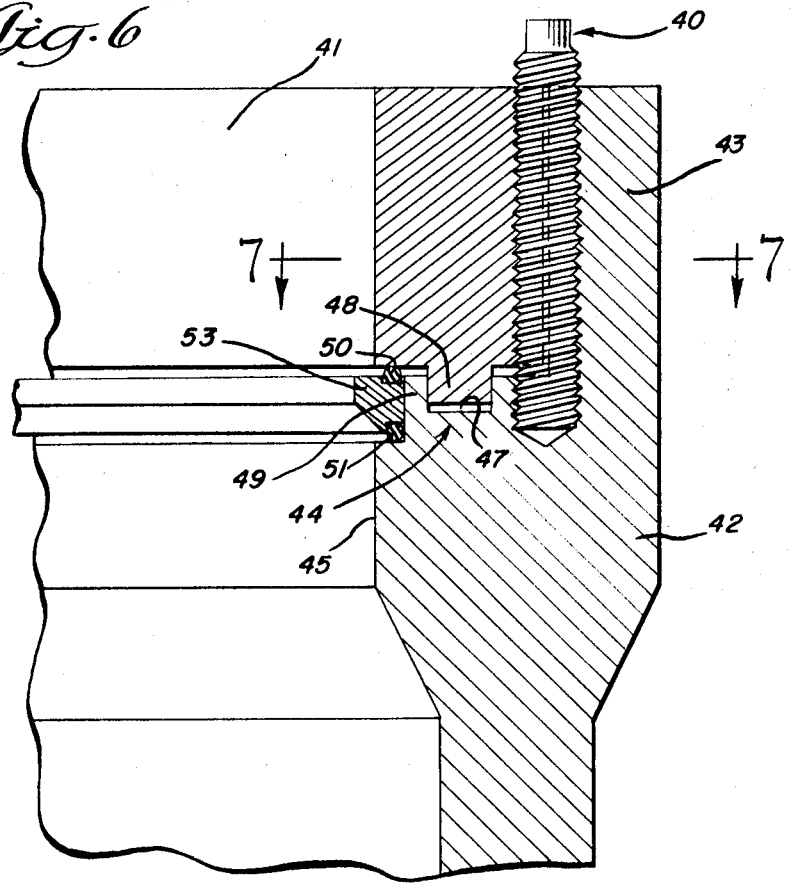
FIG. 6 is a vertical sectional view showing an edge portion of a vessel opening and the edge portion of a closure with a shear stud used to hold the closure in place in the vessel opening.
Figure 7:
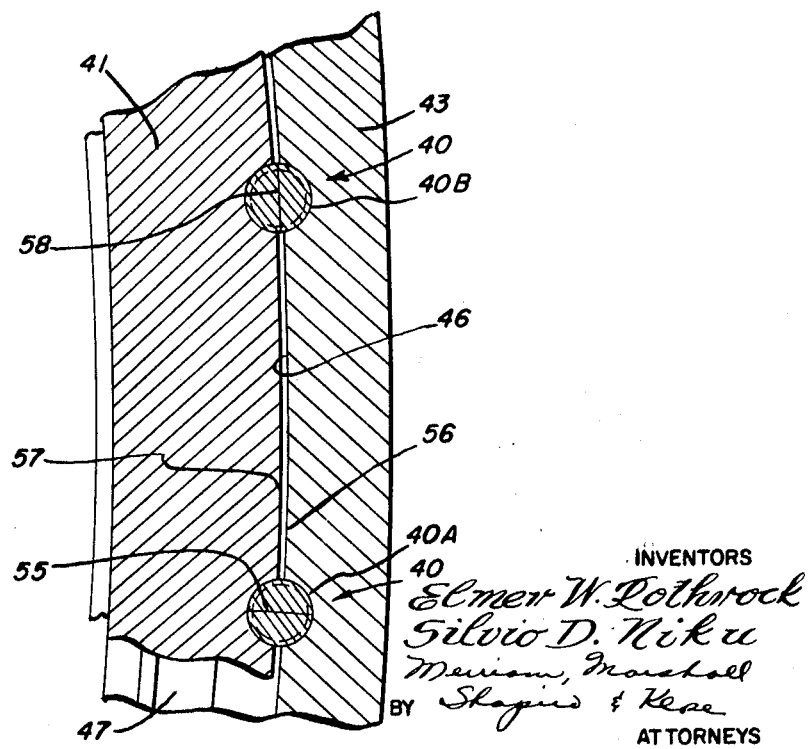
FIG. 7 is a sectional view taken along the line 7—7 of FIG. 6.

The vessel and closure combination shown in FIGS. 6 and 7 employs a series of shear studs 40 of the split type to hold circular flat closure 41 in place to close the circular opening defined by vessel wall 42. Vessel wall 42 has a projecting rim portion 43 along the opening edge and an internal shelf portion 44 which extends from the vessel inner surface 45 to the inner surface 46 of rim portion 43. Groove 47 is located in shelf 44 spaced from the inner surface 45 of wall 42. Tongue 48 projects downwardly from the bottom surface of closure 41 to nest in groove 47. The combination of tongue 48 and ring 49, defined by groove 47 and the inner edge of the vessel wall, provides an interlocking structural arrangement which resists development of a gap between the closure edge and the inner surfaces of rim portion 43 when the vessel is subjected to a high internal pressure. Self sealing expansion ring 53 having O-rings 50 and 51 seals the joint between the closure and the vessel in a gas tight manner.

As shown in FIG. 5, split shear stud 40-A composed of two longitudinal halves of a threaded stud are positioned so that the section line 55, comprising the abutting surfaces of the two halves or portions of the split stud, is located essentially lateral to rim 43 internal surface 46 and to peripheral edge 57 of closure 41. Split shear stud 40-B, as shown in FIG. 5, is located with the section line 58 between the two halves of the stud in line with the abutting edges of the inner surface 46 of rim 43 and edge 57 of closure 41. When all of the split shear studs are positioned as shown by stud 40-B, closure 41 can be removed from the vessel and repositioned in the same way by axial displacement. Once the closure has been positioned in the vessel opening, its displacement is prevented by rotating the split shear studs about 90° to about the position of split shear stud 40-A. Such a structure provides for quick opening of a vessel and for rapid reclosing for quick reutilization of the vessel.

The joint structure of this invention can be used to join a flat, dished or domed closure to a vessel opening. The joint structure is most useful for closing circular openings in vessels, especially those where the opening enlarges with high pressures in the vessel, and a quick opening closure joint system is employed in which the closure fits inside the vessel opening.

What is claimed is:

1. The combination of a pressure vessel having a circular opening and a circular closure for the opening,
    the vessel opening being walled thereabout and having an integral rim projecting forward from a shelf portion on the inside of and substantially lateral to the wall,
    a groove in the shelf portion between the inner surface of the wall and the rim defining a shear ring between the groove and the inner surface wall,
    the closure having a peripheral edge which fits inside the vessel rim in close arrangement thereto,
    a projecting tongue on the inner side of the closure which mates with and fits in the groove in the vessel shelf, and
    shear means to secure the closure to the vessel and open the same quickly.

2. The combination of claim 1, in which the shear means edge comprises a plurality of laterally projecting spaced apart tabs about the edge of the closure periphery and a plurality of inwardly extending spaced apart tabs around the inner surface of the vessel rim, with the tabs of the closure adapted to move longitudinally between tabs of the rim, and to be rotatable under the tabs of the rim.

* * * * *

UNITED STATES PATENT OFFICE
CERTIFICATE OF CORRECTION

Patent No. 3,655,090          Dated April 11, 1972

Inventor(s) ELMER WEYMAN ROTHROCK and SILVIO D. NIKU

It is certified that error appears in the above-identified patent and that said Letters Patent are hereby corrected as shown below:

Column 4, after line 55 add the following claim -- 3. The combination of claim 1 in which the closure is domed. --

Signed and sealed this 22nd day of August 1972.

(SEAL)
Attest:

EDWARD M. FLETCHER, JR.
Attesting Officer

ROBERT GOTTSCHALK
Commissioner of Patents